(12) United States Patent
Wang et al.

(10) Patent No.: US 12,450,138 B2
(45) Date of Patent: Oct. 21, 2025

(54) TURNING ON SWITCHES BASED ON APPARATUS CONNECTION SETTING A HARDWARE-IN-LOOP TEST SYSTEM

(71) Applicant: SHENZHEN YINWANG INTELLIGENT TECHNOLOGIES CO., LTD., Shenzhen (CN)

(72) Inventors: Hui Wang, Shanghai (CN); Yunfei Dong, Shanghai (CN); Jiacai Sui, Shanghai (CN); Yan Wang, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 18/464,913

(22) Filed: Sep. 11, 2023

(65) Prior Publication Data

US 2023/0418719 A1   Dec. 28, 2023

Related U.S. Application Data

(63) Continuation of application No. PCT/CN2021/083228, filed on Mar. 26, 2021.

(51) Int. Cl.
*G06F 11/22* (2006.01)
*G06F 11/273* (2006.01)

(52) U.S. Cl.
CPC ........ *G06F 11/2733* (2013.01); *G06F 11/221* (2013.01)

(58) Field of Classification Search
CPC ...... G06F 11/221; G06F 11/27; G06F 11/273; G06F 11/2733; G06F 11/2736
See application file for complete search history.

(56) References Cited

U.S. PATENT DOCUMENTS 5,615,344 A * 3/1997 Corder ............... G06F 9/4415
710/100
5,717,871 A * 2/1998 Hsieh ................. H04Q 3/68
710/317

(Continued)

FOREIGN PATENT DOCUMENTS

CN   105511217 A   4/2016
CN   108121323 A   6/2018

(Continued)

OTHER PUBLICATIONS

[No Author Listed] [online], "MicroAutoBox Break-Out Box Highlights," retrieved on Oct. 23, 2024, retrieved from URL: <https://www.dspace.com/en/pub/home/products/hw/micautob/microautobox2/mabx_breakoutbox.cfm>, 1 page.

(Continued)

*Primary Examiner* — Joseph O Schell
(74) *Attorney, Agent, or Firm* — Fish & Richardson P.C.

(57) ABSTRACT

This application relates to a signal transfer apparatus. In the apparatus, one of a plurality of switches is connected in series between a first end of each of first terminals in a first terminal group and a first end of each of second terminals in a second terminal group; a control module determines, from the plurality of switches based on apparatus connection setting, a plurality of target switches that need to be turned on, and sends a control signal for turning on the plurality of target switches to a drive circuit; and the drive circuit is connected to both the plurality of switches and the control module, and drives, based on the received control signal, the plurality of target switches to be turned on, so that signal paths between the first terminals and the second terminals that are connected to the target switches are connected.

20 Claims, 6 Drawing Sheets

(56) References Cited

U.S. PATENT DOCUMENTS

| | | | | |
|---|---|---|---|---|
| 7,152,027 | B2* | 12/2006 | Andrade | G06F 30/34 |
| | | | | 703/23 |
| 7,184,917 | B2* | 2/2007 | Pramanick | G01R 31/318342 |
| | | | | 702/123 |
| 10,230,585 | B1* | 3/2019 | A | H04L 67/34 |
| 2004/0181731 | A1* | 9/2004 | Rajsuman | G06F 11/263 |
| | | | | 714/747 |
| 2008/0079451 | A1* | 4/2008 | Maenner | G01R 31/2891 |
| | | | | 324/762.02 |
| 2013/0222000 | A1* | 8/2013 | Li | G01R 1/28 |
| | | | | 324/750.01 |
| 2015/0066417 | A1* | 3/2015 | Kimura | G06F 11/2294 |
| | | | | 702/123 |
| 2015/0253993 | A1* | 9/2015 | Miyoshi | G06F 11/34 |
| | | | | 710/5 |

FOREIGN PATENT DOCUMENTS

| | | |
|---|---|---|
| CN | 108761252 A | 11/2018 |
| CN | 209486510 U | 10/2019 |
| CN | 209627833 U | 11/2019 |

OTHER PUBLICATIONS

International Search Report and Written Opinion in International Appln. No. PCT/CN2021/083228, mailed on Dec. 30, 2021, 19 pages (with English translation).

* cited by examiner

TURNING ON SWITCHES BASED ON APPARATUS CONNECTION SETTING A HARDWARE-IN-LOOP TEST SYSTEM

CROSS-REFERENCE TO RELATED APPLICATIONS

This application is a continuation of International Application No. PCT/CN2021/083228, filed on Mar. 26, 2021, the disclosure of which is hereby incorporated by reference in its entirety.

TECHNICAL FIELD

This application relates to the technical field of test apparatuses, and in particular, to a signal transfer control method, a signal transfer apparatus, and a test system and platform.

BACKGROUND

Hardware-in-loop (HIL) testing of an apparatus such as an electronic control unit (ECU) and the like can significantly reduce development time and costs. In the hardware-in-loop testing, interface configuration and harnesses fabrication need to be performed based on hard wire interface definition of the ECU and an interface type of an I/O board of a hardware-in-loop test system. In this way, the tested ECU can be connected to the hardware-in-loop test system, to construct a test platform for subsequent testing. However, due to differences of hard wire interfaces of different ECUs and limitations of interface types of the I/O board, it is difficult to implement automatic interface configuration during construction of the test platform, and the harnesses cannot be used for universal purposes. As a result, the construction of the test platform consumes a large amount of time. Due to the limitation of time requirements, consumption of a large amount of time on the construction of the platform compresses execution time for case testing. To resolve the problem, in the related art, a signal transfer apparatus such as a signal configuration box (BOB, referred to as a signal transfer box, or the like) is connected in series between the I/O board and the ECU to implement connection between the hardware-in-loop test system and the ECU. However, the signal configuration box in the related art has problems such as poor universality, and inability to implement automatic configuration due to fixed interface configuration.

SUMMARY

In view of this, a signal transfer control method, a signal transfer apparatus, and a test system and platform are proposed.

According to a first aspect, an embodiment of this application provides a signal transfer apparatus. The apparatus includes: a first terminal group, a second terminal group, a plurality of switches, a control module, and a drive circuit.

The first terminal group includes a plurality of first terminals, the second terminal group includes a plurality of second terminals, and one of the plurality of switches is connected in series between a first end of each of the first terminals and a first end of each of the second terminals.

The control module is configured to: determine, from the plurality of switches based on apparatus connection setting, a plurality of target switches that need to be turned on, and send a control signal for turning on the plurality of target switches to the drive circuit.

The drive circuit is connected to both the plurality of switches and the control module, and is configured to drive, based on the received control signal, the plurality of target switches to be turned on, so that signal paths between the first terminals and the second terminals that are connected to the target switches are connected.

The apparatus connection setting is used to indicate a hardware-in-loop test system and a to-be-tested apparatus that are connected to the signal transfer apparatus, the first terminals connected to the hardware-in-loop test system, and the second terminals connected to the to-be-tested apparatus.

According to the first aspect, test personnel may configure a mapping relationship between terminals in the first terminal group and the second terminal group of the signal transfer apparatus in a customized and automated manner according to an actual requirement. A configuration process of the apparatus is simple, efficient, and accurate, and the apparatus has good universality and a strong capability to expand a quantity of terminals. A test platform is constructed based on the apparatus efficiently and quickly, which significantly reduces construction time.

With reference to the first aspect, in a first possible implementation of the apparatus, the apparatus further includes:
  a storage module, configured to store at least one signal configuration list, where each signal configuration list is used to record a switch that needs to be turned on in the plurality of switches under different apparatus connection setting.

The control module is further configured to obtain a target signal configuration list corresponding to the apparatus connection setting from the storage module, and buffer the target signal configuration list.

The determining, from the plurality of switches based on apparatus connection setting, a plurality of target switches that need to be turned on includes: determining, from the plurality of switches based on the target signal configuration list and the apparatus connection setting, the plurality of target switches that need to be turned on.

According to the first possible implementation of the first aspect, the signal configuration list is preset for storage, so that a process of configuring the mapping relationship between the terminals in the first terminal group and the second terminal group can be simplified.

With reference to the first possible implementation of the first aspect, in a second possible implementation of the apparatus, the control module is further configured to replace, according to a received list switching instruction, a currently buffered target signal configuration list with a signal configuration list in the storage module that is indicated by the list switching instruction.

According to the second possible implementation of the first aspect, the test personnel may switch, according to the list switching instruction, the target signal configuration list used by the control module.

With reference to the second possible implementation of the first aspect, in a third possible implementation of the apparatus, a communications module is configured to: communicate with a terminal device, and forward, to the control module, the list switching instruction received from the terminal device. In this way, the test personnel can remotely configure the mapping relationship between the terminals in the first terminal group and the second terminal group by using the terminal device.

With reference to the third possible implementation of the first aspect, in a fourth possible implementation of the apparatus, the communications module is further configured to receive a newly added signal configuration list from the terminal device, and forward the newly added signal configuration list to the storage module. The storage module is further configured to store the received newly added signal configuration list. The test personnel may remotely send the newly added signal configuration list to the apparatus by using the terminal device, and configure the mapping relationship between the terminals in the first terminal group and the second terminal group by using the newly added signal configuration list.

With reference to the third or the fourth possible implementation of the first aspect, in a fifth possible implementation of the apparatus, the communications module is further configured to receive a list deletion instruction from the terminal device, and forward the list deletion instruction to the storage module. The storage module is further configured to delete, according to the received list deletion instruction, a signal configuration list that the list deletion instruction instructs to delete. In this way, the test personnel may remotely delete, by using the terminal device, the signal configuration list that is no longer used in the storage module.

With reference to any one of the third to the fifth possible implementations of the first aspect, in a sixth possible implementation of the apparatus, the communications module is further configured to receive the apparatus connection setting from the terminal device, and forward the apparatus connection setting to the control module. The test personnel may remotely send the apparatus connection setting by using the terminal device, to implement remote configuration of the mapping relationship between the terminals in the first terminal group and the second terminal group.

With reference to any one or more of the first aspect and the possible implementations of the first aspect, in a seventh possible implementation of the apparatus, the switch includes at least one of a diode, a transistor, a field-effect transistor, and a circuit breaker.

With reference to any one or more of the first aspect and the possible implementations of the first aspect, in an eighth possible implementation of the apparatus, the control module includes a plurality of control sub-modules, the plurality of switches are divided into a plurality of switch groups, the control sub-modules control turn-on/turn-off of switches in different switch groups, and the control sub-modules each are connected to the drive circuit. The control sub-modules each are configured to: when it is determined, based on the apparatus connection setting, that a controlled switch group includes at least one target switch that needs to be turned on, send the control signal for turning on the at least one target switch to the drive circuit. In this way, a scale of the signal transfer apparatus may be expanded, and quantities of the first terminals and the second terminals may be increased.

With reference to the eighth possible implementation of the first aspect, in a ninth possible implementation of the apparatus, the drive circuit includes a plurality of drive sub-circuits, and the drive sub-circuits each are connected to at least one of the plurality of switches and the control sub-modules that control the at least one switch. The sending the control signal for turning on the at least one target switch to the drive circuit includes: sending the control signal for turning on the at least one target switch to drive sub-circuits connected to the target switches. In this way, the connected switches are driven by using different drive sub-circuits, so that each switch can be independently driven, thereby facilitating customized configuration of the mapping relationship between the terminals in the first terminal group and the second terminal group.

With reference to the ninth possible implementation of the first aspect, in a tenth possible implementation of the apparatus, all switches connected to the drive sub-circuits belong to a same switch group. In this way, switches in one switch group may be controlled by using one control sub-module and one drive sub-circuit.

With reference to the ninth or tenth possible implementation of the first aspect, in an eleventh possible implementation of the apparatus, the drive sub-circuits each include a transistor and a resistor.

With reference to any one or more of the first aspect and the possible implementations of the first aspect, in a twelfth possible implementation of the apparatus, the plurality of switches are arranged in an array, a quantity of rows of the switches in the array is the same as a quantity of the first terminals, and a quantity of columns of the switches in the array is the same as a quantity of the second terminals.

The first end of each of the first terminals is connected to each of the switches in a corresponding row in the array.

The first end of each of the second terminals is connected to each of the switches in a corresponding column in the array.

With reference to any one or more of the first aspect and the possible implementations of the first aspect, in a thirteenth possible implementation of the apparatus, when a quantity of switches connected to the drive sub-circuits is 1, the drive sub-circuits are arranged on one side of the connected switches.

According to the eleventh or twelfth possible implementations of the first aspect, the plurality of switches and the drive sub-circuits for the switches are arranged in an array to facilitate maintenance of the signal transfer apparatus.

According to a second aspect, an embodiment of this application provides a test system. The system includes:
  the signal transfer apparatus according to any one of the first aspect or the possible implementations of the first aspect; and
  a hardware-in-loop test system, connected to the signal transfer apparatus through an I/O interface.

According to a third aspect, an embodiment of this application provides a test platform. The test platform includes:
  the signal transfer apparatus according to any one of the first aspect or the possible implementations of the first aspect;
  a hardware-in-loop test system, connected to the signal transfer apparatus through a first I/O interface; and
  a to-be-tested apparatus, connected to the signal transfer apparatus through a second I/O interface.

According to a fourth aspect, an embodiment of this application provides a signal transfer control method. The method includes:
  determining, from a plurality of switches of a signal transfer apparatus based on apparatus connection setting, a plurality of target switches that need to be turned on, where one of the plurality of switches is connected in series between a first end of each of a plurality of first terminals in a first terminal group of the signal transfer apparatus and a first end of each of a plurality of second terminals in a second terminal group of the signal transfer apparatus; and
  generating a control signal for turning on the plurality of target switches.

The apparatus connection setting is used to indicate a hardware-in-loop test system and a to-be-tested apparatus that are connected to the signal transfer apparatus, the first terminals connected to the hardware-in-loop test system, and the second terminals connected to the to-be-tested apparatus.

According to the fourth aspect, test personnel may configure a mapping relationship between terminals in the first terminal group and the second terminal group of the signal transfer apparatus in a customized and automated manner according to an actual requirement, and a test platform is constructed efficiently and quickly, which significantly reduces construction time.

With reference to the fourth aspect, in a first possible implementation of the method, the method further includes: driving, based on the control signal, the plurality of target switches to be turned on, so that signal paths between the first terminals and the second terminals that are connected to the target switches are connected.

With reference to the fourth aspect or the first possible implementation of the fourth aspect, in a second possible implementation of the method, the method further includes: obtaining, from at least one signal configuration list stored in a storage module, a target signal configuration list corresponding to the apparatus connection setting, and buffering the target signal configuration list, where each signal configuration list is used to record a switch that needs to be turned on in the plurality of switches under different apparatus connection setting.

The determining, from a plurality of switches of a signal transfer apparatus based on apparatus connection setting, a plurality of target switches that need to be turned on includes: determining, from the plurality of switches based on the target signal configuration list and the apparatus connection setting, the plurality of target switches that need to be turned on.

According to the second possible implementation of the fourth aspect, the signal configuration list is preset for storage, so that a process of configuring the mapping relationship between the terminals in the first terminal group and the second terminal group can be simplified.

With reference to the second possible implementation of the fourth aspect, in a third possible implementation of the method, the method further includes: replacing, according to a received list switching instruction, a currently buffered target signal configuration list with a signal configuration list in the storage module that is indicated by the list switching instruction. In this way, the test personnel may switch, according to the list switching instruction, the target signal configuration list used by the control module.

With reference to the third possible implementation of the fourth aspect, in a fourth possible implementation of the method, the method further includes: communicating with a terminal device, and receiving the list switching instruction from the terminal device. In this way, the test personnel can remotely configure the mapping relationship between the terminals in the first terminal group and the second terminal group by using the terminal device.

With reference to the fourth possible implementation of the fourth aspect, in a fifth possible implementation of the method, the method further includes: receiving a newly added signal configuration list from the terminal device, and forwarding the newly added signal configuration list to the storage module, so that the storage module stores the received newly added signal configuration list. The test personnel may remotely send the newly added signal configuration list by using the terminal device, and configure the mapping relationship between the terminals in the first terminal group and the second terminal group by using the newly added signal configuration list.

With reference to the fourth or the fifth possible implementation of the fourth aspect, in a sixth possible implementation of the method, the method further includes: receiving a list deletion instruction from the terminal device, and forwarding the list deletion instruction to the storage module, so that the storage module deletes, according to the received list deletion instruction, a signal configuration list that the list deletion instruction instructs to delete. In this way, the test personnel may remotely delete the signal configuration list in the storage module by using the terminal device.

With reference to any one of the fourth to the sixth possible implementations of the fourth aspect, in a seventh possible implementation of the method, the method further includes: receiving the apparatus connection setting from the terminal device. The test personnel may remotely send the apparatus connection setting by using the terminal device, to implement remote configuration of the mapping relationship between the terminals in the first terminal group and the second terminal group.

With reference to any one or more of the fourth aspect and the possible implementations of the fourth aspect, in an eighth possible implementation of the method, the plurality of switches are divided into a plurality of switch groups. The determining, from a plurality of switches of a signal transfer apparatus based on apparatus connection setting, a plurality of target switches that need to be turned on includes: determining, based on the apparatus connection setting, a target switch that needs to be turned on in the switch groups. The generating a control signal for turning on the plurality of target switches includes: generating a control signal for turning on a target switch that needs to be turned on in the switch groups. In this way, a scale of the signal transfer apparatus may be expanded, and quantities of the first terminals and the second terminals may be increased.

According to the following detailed description of example embodiments with reference to the accompanying drawings, other features and aspects of this application becomes clear.

BRIEF DESCRIPTION OF DRAWINGS

The accompanying drawings included in this specification and constituting a part of this specification, together with this specification, illustrate example embodiments, features, and aspects of this application, and are used to explain the principles of this application.

DESCRIPTION OF EMBODIMENTS

The following describes various example embodiments, features, and aspects of this application in detail with reference to the accompanying drawings. Identical reference numerals in the accompanying drawings indicate elements that have same or similar functions. Although various aspects of the embodiments are illustrated in the accompanying drawing, the accompanying drawings are not necessarily drawn to scale unless otherwise specified.

The specific term "example" herein means "used as an example, embodiment, or illustration". Any embodiment described herein as "example" is not necessarily construed as being superior to or better than other embodiments.

In addition, to better describe this application, numerous specific details are given in the following specific implementations. Persons skilled in the art should understand that this application can also be implemented without some specific details. In some embodiments, methods, means, elements and circuits that are well-known to persons skilled in the art are not described in detail, so that the subject matter of this application is highlighted.

To resolve the foregoing problem, a signal transfer apparatus provided in the related art includes a first terminal group connected to a hardware-in-loop test system and a second terminal group connected to an ECU. In one technical solution, connection mapping relationships between a first terminal group and a second terminal group in a signal transfer apparatus, and between terminals in the first terminal group and the second terminal group are specifically set based on an interface feature of an ECU that needs to be tested and an interface feature of the hardware-in-loop test system, so as to meet a requirement of connection between the ECU and the hardware-in-loop test system. However, because the connection mapping relationships between the first terminal group and the second terminal group, and between the terminals in the first terminal group and the second terminal group are fixed, universality is poor. In addition, because the connection mapping relationship between the terminals in the first terminal group and the second terminal group is fixed, the connection mapping relationship cannot be changed according to an actual requirement. Alternatively, in another technical solution, the terminals in the first terminal group and the second terminal group in the signal transfer apparatus are connected by using a switch socket that can be turned on or off. When a user needs to customize a configuration interface, the user manually turns on or off the switch according to a requirement, and then configuration is implemented by using a jumper.

This application provides a signal transfer apparatus, through which test personnel may configure a mapping relationship between terminals in the first terminal group and the second terminal group in a customized and automated manner according to an actual requirement. A configuration process of the apparatus is simple, efficient, and accurate, and the apparatus has good universality and a strong capability to expand a quantity of terminals. A test platform is constructed based on the apparatus efficiently and quickly, which significantly reduces construction time.

Figure 1:
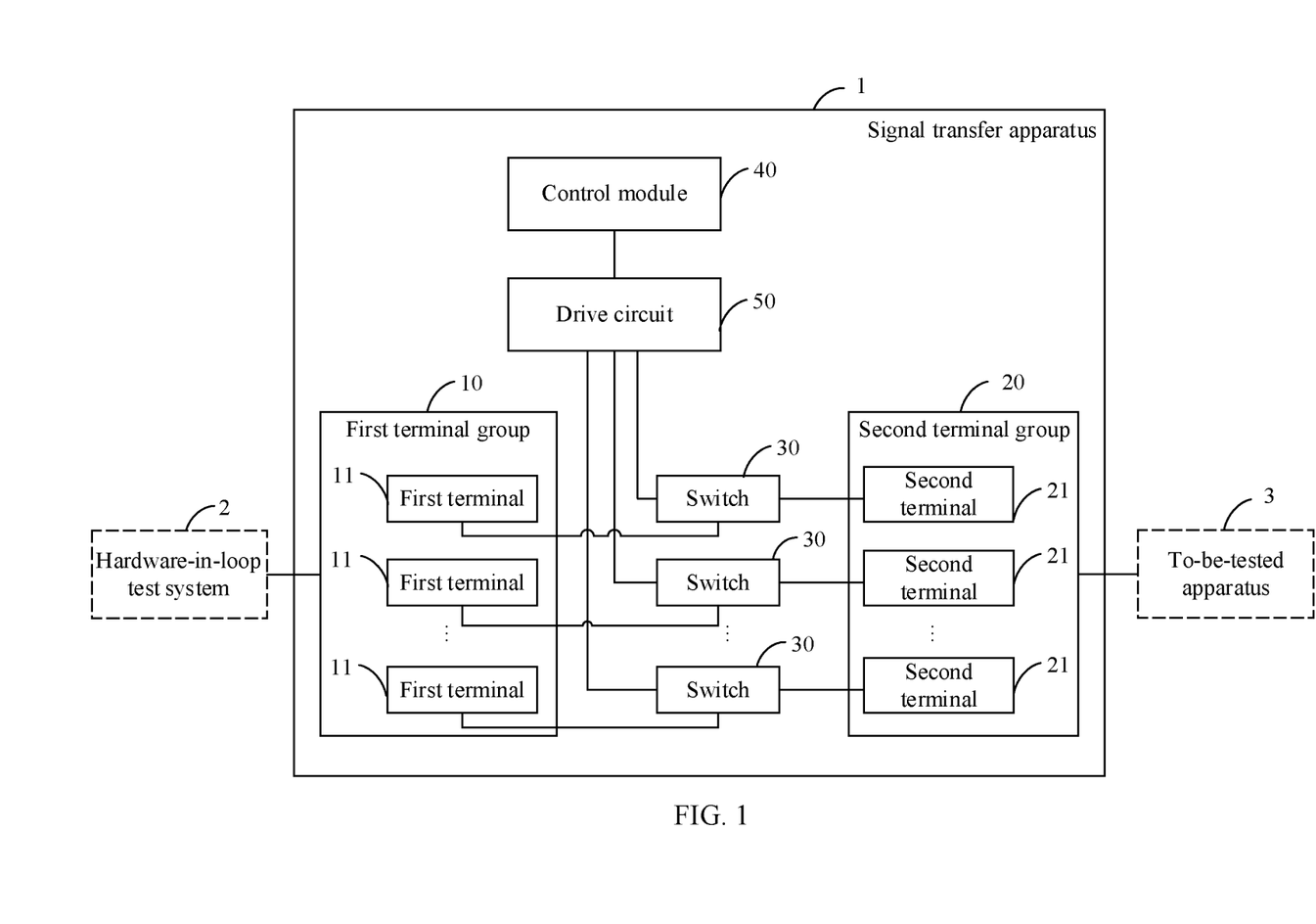
FIG. 1 is a schematic diagram of a structure of a signal transfer apparatus according to an embodiment of this application.

FIG. 1 is a schematic diagram of a structure of a signal transfer apparatus according to an embodiment of this application. As shown in FIG. 1, the apparatus 1 includes a first terminal group 10, a second terminal group 20, a plurality of switches 30, a control module 40, and a drive circuit 50.

The first terminal group 10 includes a plurality of first terminals 11, the second terminal group 20 includes a plurality of second terminals 21, and one of the plurality of switches 30 is connected in series between a first end (not shown in the figure) of the first terminal 11 and a first end (not shown in the figure) of the second terminal 21.

The control module 40 is connected to the drive circuit 50, and is configured to determine, from the plurality of switches 30 based on apparatus connection setting, a plurality of target switches that need to be turned on, and send a control signal for turning on the plurality of target switches to the drive circuit 50. The apparatus connection setting is used to indicate a hardware-in-loop test system 2 and a to-be-tested apparatus 3 that are connected to the signal transfer apparatus 1, the first terminals 11 connected to the hardware-in-loop test system 2, and the second terminals 21 connected to the to-be-tested apparatus 3. When the hardware-in-loop test system 2 and the to-be-tested apparatus 3 each are connected to the signal transfer apparatus, the hardware-in-loop test system 2 is connected to a second end of each of the first terminals 11 to be connected, and the to-be-tested apparatus 3 is connected to a second end of each of the second terminals to be connected. First ends and second ends of the first terminal 11 and the second terminal 21 may be pins or the like. This is not limited in this application.

The drive circuit 50 is connected to both the plurality of switches 30 and the control module. The drive circuit is configured to drive, based on the control signal, the plurality of target switches to be turned on, so that signal paths between the first terminals 11 and the second terminals 21 that are connected to the target switches are connected.

In this embodiment, the control module 40 may have a function of interacting with test personnel, so as to determine the apparatus connection setting based on a detected input operation of the test personnel. Alternatively, the control module 40 may obtain the apparatus connection setting sent by another terminal device.

The apparatus connection setting may include a parameter of the to-be-tested apparatus 3 and an interface parameter of the hardware-in-loop test system 2, so as to indicate different to-be-tested apparatuses 3 and hardware-in-loop test systems 2. An interface parameter of the to-be-tested apparatus 3 may be a parameter that can represent an I/O interface feature of the to-be-tested apparatus, for example, a product model, a name, or an interface setting manner of the to-be-tested apparatus. The interface parameter of the hardware-in-loop test system 2 may be a parameter that can represent an interface feature of an I/O board of the hardware-in-loop test system 2, for example, a product model, a name, or an interface setting manner of the I/O board used by the hardware-in-loop test system 2.

The apparatus connection setting may further include an identifier of the first terminal 11 connected to the hardware-in-loop test system 2, and an identifier of the second terminal 21 connected to the to-be-tested apparatus 3, so as to indicate the first terminal 11 and the second terminal 21 to be used. The identifier of the first terminal 11 may be a number, a name, or the like of the first terminal 11 in the signal transfer apparatus 1. The identifier of the second terminal 21 may be a number, a name, or the like of the second terminal 21 in the signal transfer apparatus 1.

The control module 40 may determine, based on the apparatus connection setting, that the first terminal and the second terminal need to be used if the to-be-tested apparatus 3 and the hardware-in-loop test system 2 are connected to the signal transfer apparatus 1. In addition, according to a signal transmission requirement determined for communication between the to-be-tested apparatus 3 and the hardware-in-loop test system 2 based on the parameter of the to-be-tested apparatus 3 and the interface parameter of the hardware-in-loop test system 2, a mapping relationship (the mapping relationship corresponds to a signal path that needs to be connected) between the first terminal and the second terminal that need to be used is determined. In this way, a plurality of target switches are determined, so that the mapping relationship between the first terminal and the second terminal that are connected because each target switch is turned on meets the signal transmission requirement of the to-be-tested apparatus 3 and the hardware-in-loop test system 2. A signal path between the first terminal and the second terminal that are connected because each target switch is turned on is a signal path that meets the signal transmission requirement of the to-be-tested apparatus 3 and the hardware-in-loop test system 2.

At least the first terminal group, the second terminal group, and the plurality of switches in the signal transfer apparatus 1 are arranged on a same hardware body. The control module and/or the drive circuit may be arranged externally, or may be arranged on a same hardware body as other parts of the signal transfer apparatus 1. This is not limited in this application.

Figure 2:
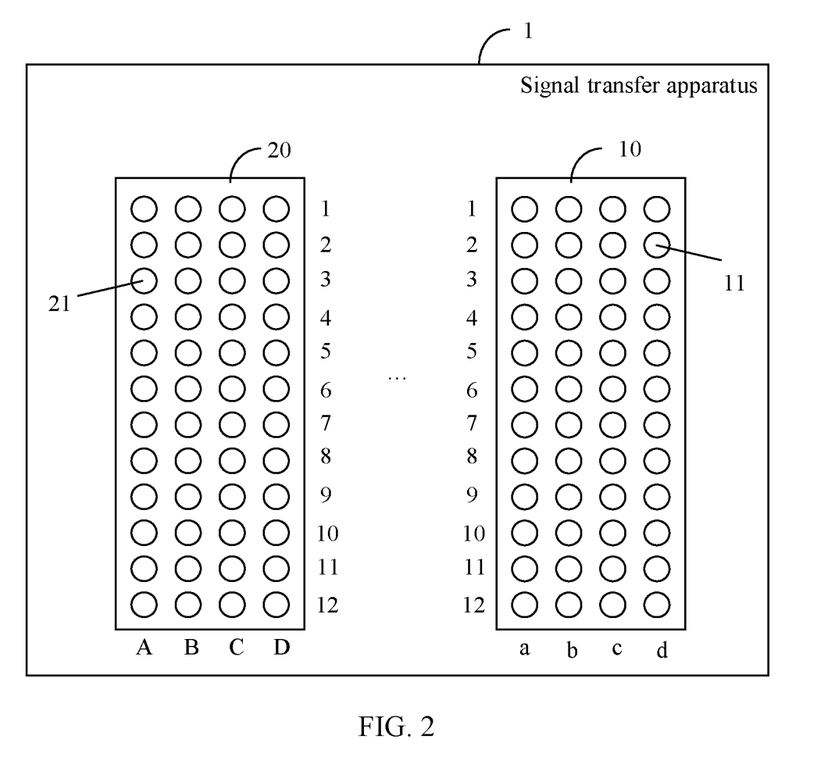
FIG. 2 is a schematic diagram of a structure of terminals in a signal transfer apparatus according to an embodiment of this application.

During use of the signal transfer apparatus 1, the signal transfer apparatus 1 may be connected to at least one hardware-in-loop test system 2 and at least one to-be-tested apparatus 3. Quantities and locations of the first terminals and the second terminals may be set in advance according to different use requirements of the hardware-in-loop test system 2 and the to-be-tested apparatus 3. FIG. 2 is a schematic diagram of a structure of terminals in a signal transfer apparatus according to an embodiment of this application. To highlight an arrangement manner of terminals in the illustrative apparatus, FIG. 2 shows only the first terminal group 10 and the second terminal group 20, and other parts of the apparatus are not shown. As shown in FIG. 2, the plurality of first terminals 11 of the first terminal group 10 and the second terminals 21 of the second terminal group 20 may be arranged in an array. In addition, an array arrangement manner of the plurality of first terminals 11 of the first terminal group 10 may correspond to an interface of an I/O board of the hardware-in-loop test system 2, and an array arrangement manner of the second terminals 21 of the second terminal group 20 may correspond to an interface of the to-be-tested apparatus 3, so as to simplify connection between the to-be-tested apparatus 3 and the hardware-in-loop test system 2, improve construction of a test platform, and reduce construction time. For example, assuming that it is determined that the signal transfer apparatus 1 may be connected to a hardware-in-loop test system 2 having three different types of interfaces of the I/O board during use, the array arrangement manner of the plurality of first terminals may be separately set for various interfaces of the I/O board of the hardware-in-loop test system 2. For example, the plurality of first terminals may be divided into different parts, and an array arrangement manner of the first terminals of each part corresponds to different types of interfaces of the I/O board of the hardware-in-loop test system 2, so that each part of the first terminals can match corresponding types of interfaces of the I/O board of the hardware-in-loop test system 2, and the test personnel may connect the interfaces of the I/O board of the hardware-in-loop test system 2 to the first terminals of a corresponding part by plugging and unplugging. Similarly, an array arrangement manner of the plurality of second terminals may also be separately set for various interfaces of the to-be-tested apparatus 3. For example, the plurality of second terminals may be divided into different parts, and array arrangement manners of the second terminals of the parts correspond to different types of interfaces of the to-be-tested apparatus 3, so that the second terminals of the parts can match corresponding types of interfaces of the to-be-tested apparatus 3. The test personnel may connect the interfaces of the to-be-tested apparatus 3 to the second terminals of a corresponding part by plugging and unplugging.

In this embodiment, the target switches to be turned on are different, and the first terminal 11 and the second terminal 21 that implement connection of the signal path is also different. For example, as shown in FIG. 2, the plurality of first terminals 11 of the first terminal group 10 have four columns and 12 rows, which are respectively a1, a2, ..., and d12, and the second terminals 21 of the second terminal group 20 also have four columns and 12 rows, which are respectively A1, A2, ..., and D12. In this case, there may be 48×48 switches 30, and each of the switches 30 is connected in series between one first terminal and one second terminal. For example, if it is determined, according to the apparatus connection setting, that mapping relationships between the terminals in the first terminal group 10 and the second terminal group 20 are that signal paths between A1 and a1, between A2 and a2, ..., and between D12 and d12 are connected, the target switches are switches between A1 and a1, between A2 and a2, ..., and between D12 and d12. The control module outputs a control signal that enables switches (that is, the target switches) between A1 and a1, between A2 and a2, ..., and between D12 and d12 to be turned on, and other switches to be turned off, so that the drive circuit drives, based on the control signal, the target switches to implement signal paths between A1 and a1, between A2 and a2, ..., and between D12 and d12 to be connected.

Figure 3A:
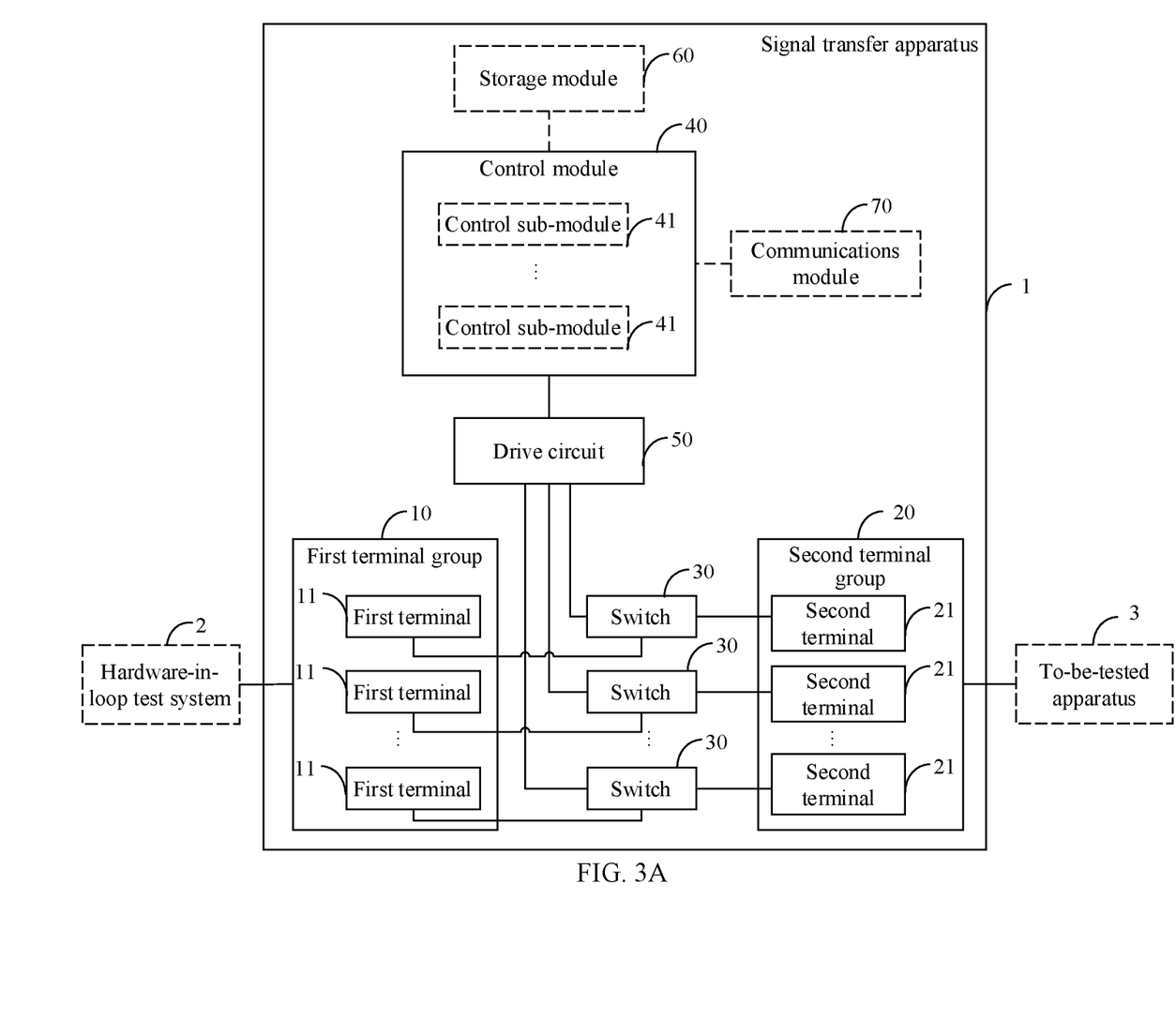
FIG. 3A and FIG. 3B are schematic diagrams of a structure of a signal transfer apparatus according to an embodiment of this application.

FIG. 3A is a schematic diagram of a structure of a signal transfer apparatus according to an embodiment of this application. In a possible implementation, as shown in FIG. 3A, the apparatus may further include a storage module 60.

The storage module 60 is configured to store at least one signal configuration list. Each signal configuration list is used to record a switch that needs to be turned on in the plurality of switches under different apparatus connection setting.

The control module 40 is further configured to obtain a target signal configuration list corresponding to the apparatus connection setting from the storage module 60, and buffer the target signal configuration list. The determining, from the plurality of switches 30 based on apparatus connection setting, a plurality of target switches that need to be turned on includes: determining, from the plurality of switches based on the target signal configuration list and the apparatus connection setting, the plurality of target switches 30 that need to be turned on.

In this implementation, at least one signal configuration list may be stored in the storage module 60 in advance according to a test requirement. For example, having known the interface feature of the to-be-tested apparatus 3 that needs to be tested and the interface feature of the hardware-in-loop test system 2, the test personnel set a signal configuration list that meets a requirement, and then store the signal configuration list in the storage module 60 for the control module 40 to invoke a cache, so as to simplify a configuration process of the mapping relationship between the terminals in the first terminal group and in the second terminal group.

In a possible implementation, the control module 40 is further configured to replace, according to a received list switching instruction, a currently buffered target signal configuration list with a signal configuration list in the storage module that is indicated by the list switching instruction.

In this implementation, the test personnel may determine a target signal configuration list that needs to be used, and then send the list switching instruction to the control module 40, so as to switch, according to the list switching instruction, the target signal configuration list used by the control module. The list switching instruction may be sent by the test personnel to the control module 40 by using a terminal device, an instruction sending module directly connected to the control module, or the like.

In a possible implementation, as shown in FIG. 3A, the apparatus may further include a communications module 70. The communications module 70 is configured to: communicate with a terminal device, and forward, to the control module 40, the list switching instruction received from the terminal device. In this way, the test personnel can remotely configure the mapping relationship between the terminals in the first terminal group and the second terminal group by using the terminal device.

In a possible implementation, the communications module 70 is further configured to receive a newly added signal configuration list from the terminal device, and forward the newly added signal configuration list to the storage module 60. The storage module 60 is further configured to store the received newly added signal configuration list.

In this implementation, the test personnel may remotely send the newly added signal configuration list to the apparatus by using the terminal device, and remotely configure the mapping relationship between the terminals in the first terminal group and the second terminal group by implementing the newly added signal configuration list.

In a possible implementation, the communications module 70 is further configured to receive a list deletion instruction from the terminal device, and forward the list deletion instruction to the storage module 60. The storage module 60 is further configured to delete, according to the received list deletion instruction, a signal configuration list that the list deletion instruction instructs to delete. In this way, the test personnel may remotely delete, by using the terminal device, the signal configuration list that is no longer used subsequently in the storage module 60.

In a possible implementation, the communications module 70 is further configured to receive the apparatus connection setting from the terminal device, and forward the apparatus connection setting to the control module 40. The test personnel may remotely send the apparatus connection setting by using the terminal device, to implement remote configuration of the mapping relationship between the terminals in the first terminal group and the second terminal group.

In a possible implementation, the control module may be a device such as a complex programmable logic device (CPLD) or a field-programmable gate array (FPGA).

Figure 3B:
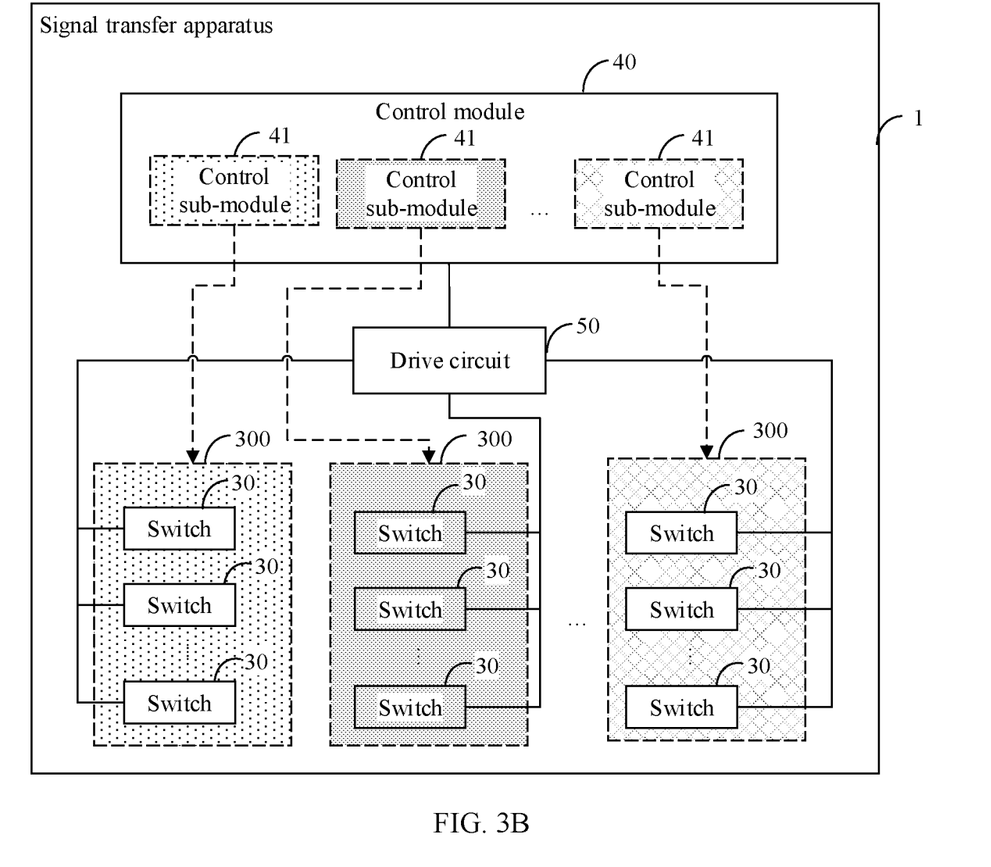

FIG. 3B is a schematic diagram of a structure of a signal transfer apparatus according to an embodiment of this application. To expand a scale (namely, quantities of the first terminals and the second terminals) of the signal transfer apparatus, in a possible implementation, as shown in FIG. 3B, the control module 40 may include a plurality of control sub-modules 41. Each control sub-module 41 may be a CPLD or an FPGA. The plurality of switches 30 may be divided into a plurality of switch groups 300, the control sub-modules 41 control turn-on/turn-off of switches 30 in different switch groups 300, and the control sub-modules 41 each are connected to the drive circuit 50. The control sub-modules 41 each are configured to: when it is determined, based on the apparatus connection setting, that a controlled switch group 300 includes at least one target switch that needs to be turned on, send the control signal for turning on the at least one target switch to the drive circuit 50.

FIG. 3B shows only the control module 40, the drive circuit 50, and the plurality of switches 30 of the signal transfer apparatus 1, and other components of the signal transfer apparatus 1 are not shown. In addition, a dashed line with an arrow between the control sub-module 41 and the switch group 300 is used to illustrate a control relationship between the control sub-module 41 and the switch group 300, and does not indicate that there is a physical connection relationship between the control sub-module 41 and the switch group 300. In addition, for a more intuitive illustration, in FIG. 3B, the switch groups 300 controlled by different control sub-modules 41 are distinguished by using different filling patterns, and a same filling pattern indicates that there is a controlling relationship and a controlled relationship between the control sub-module 41 and the switch group 300.

Each control sub-module may be a device such as a CPLD or an FPGA. A quantity of the first terminals 11 in the first terminal group 10 and a quantity of the second terminals 21 in the second terminal group 20 may be set as required. The control sub-modules implement driving control on switches in one switch group of the apparatus. When there is a large quantity of terminals and a large quantity of switches, and one control sub-module cannot control a plurality of switches, the plurality of control sub-modules implement driving control on switches in different switch groups. In this way, a scale of the signal transfer apparatus 1 may be expanded without increasing a hardware performance requirement (performance of components such as a CPLD and an FPGA) of the signal transfer apparatus 1, thereby reducing costs of the signal transfer apparatus 1.

In a possible implementation, the plurality of switches 30 may include at least one of a diode, a transistor, a field-effect transistor, and a circuit breaker. The field-effect transistor includes an insulated gate field-effect transistor MOS, a junction field-effect transistor, and the like. The switches 30 in the signal transfer apparatus 1 may be any one of a diode, a transistor, a field-effect transistor, and a circuit breaker. The switches 30 in the signal transfer apparatus 1 may be a same component. For example, the switches 30 each may be a transistor. Alternatively, the switches 30 in the signal transfer apparatus 1 may not be completely the same. For example, some switches 30 are diodes, and the other switches 30 are transistors. Persons skilled in the art may set an implementing manner of the switches 30 according to an actual requirement. This is not limited in this application.

In a possible implementation, the drive circuit 50 may include a plurality of drive sub-circuits, and drive sub-circuits each are connected to at least one of the plurality of switches 30 and the control sub-modules 41 that control the at least one switch. The sending the control signal for turning on the at least one target switch to the drive circuit 50 includes: sending the control signal for turning on the at least one target switch to drive sub-circuits connected to the target switches.

The plurality of switches 30 in the signal transfer apparatus 1 may be divided into different parts, and switches 30 of each part are driven by the plurality of drive sub-circuits. After generating the control signal, the control sub-modules 41 or the control module 40 send/sends the control signal to the drive sub-circuits that drive the target switches, so that the drive sub-circuits that receive the control signal can drive a target switch in the switches that can be driven by the drive sub-circuits to be turned on. In this way, the connected switches 30 are driven by using different drive sub-circuits, so that each switch 30 can be independently driven, thereby facilitating customized configuration of the mapping relationship between the terminals in the first terminal group and the second terminal group.

In a possible implementation, all switches connected to the drive sub-circuits may belong to a same switch group. In this way, switches in one switch group may be controlled by using one control sub-module and one drive sub-circuit, thereby simplifying a driving implementation process.

In a possible implementation, the drive sub-circuits each include a transistor and a resistor. The drive sub-circuits may be set based on different switches driven by the drive sub-circuits. This is not limited in this application.

Figure 4:
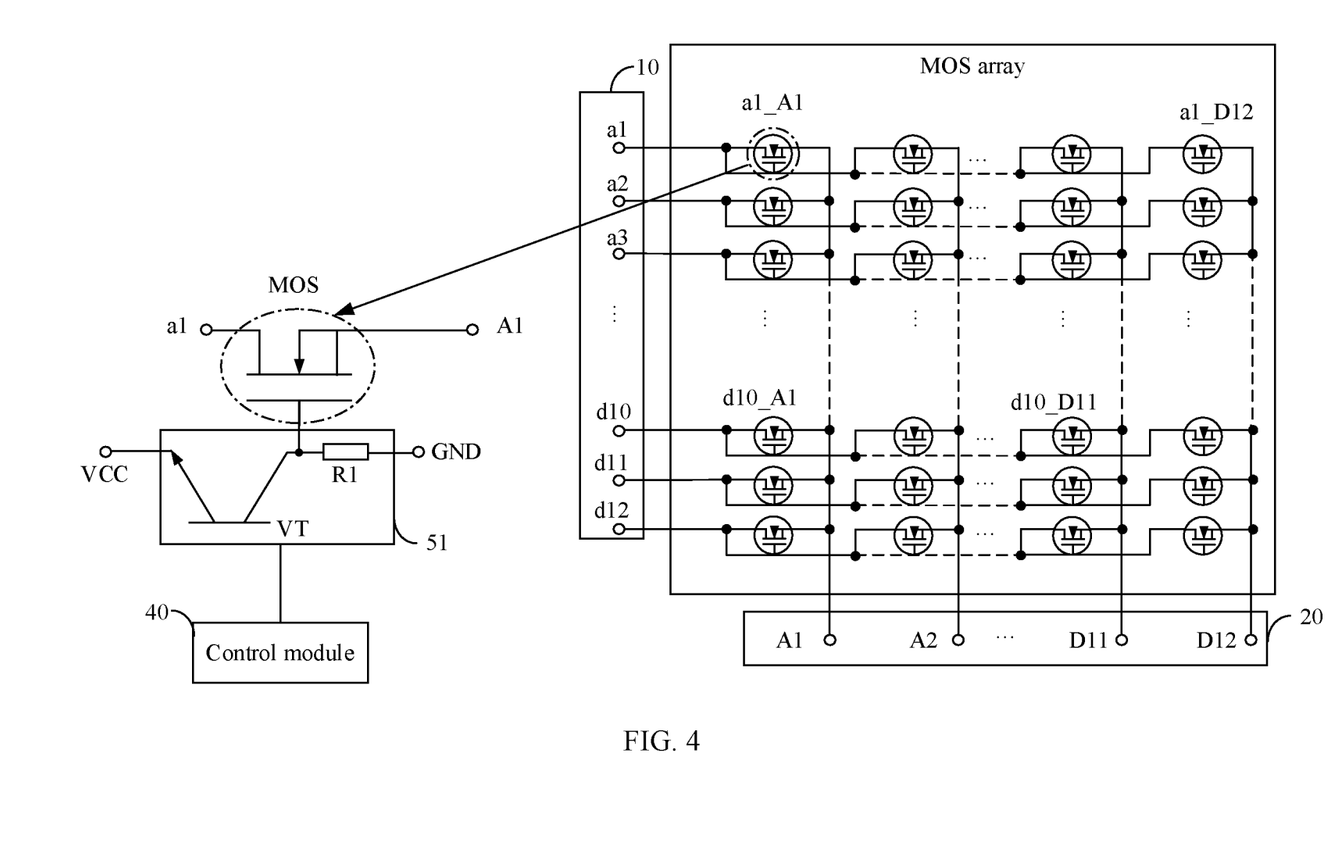
FIG. 4 is a schematic diagram of a structure of a signal transfer apparatus according to an embodiment of this application.

FIG. 4 is a schematic diagram of a structure of a signal transfer apparatus according to an embodiment of this application. To illustrate the connection relationship, FIG. 4 shows only a part of the signal transfer apparatus 1. In a possible implementation, as shown in FIG. 4, the switches 30 each include a field-effect transistor MOS, the drive circuit 50 may include a plurality of drive sub-circuits 51, the drive sub-circuit 51 is configured to drive a connected field-effect transistor MOS, and the drive sub-circuits 51 each include a transistor VT and a resistor R1. In FIG. 4, the field-effect transistor MOS is, for example, an NMOS. A source of each field-effect transistor MOS is connected to the first end of the first terminal, a drain is connected to the first end of the second terminal, and a gate is connected to an emitter of the transistor VT in a corresponding drive sub-circuit. In each drive sub-circuit 51, the emitter of the transistor VT is grounded GND through the resistor R1, a collector is connected to a power supply VCC, and a base is connected to the control module 40, so as to receive the control signal.

In a possible implementation, the plurality of switches 30 may be arranged in an array, a quantity of rows of the switches 30 in the array is the same as a quantity of the first terminals 11, and a quantity of columns of the switches 30 in the array is the same as a quantity of the second terminals 21. The first end of each of the first terminals 11 is connected to each of the switches 30 in a corresponding row in the array, and the first end of each of the second terminals 21 is connected to each of the switches 30 in a corresponding column in the array. In this way, connection between the second terminal, the first terminal, and the switch can be performed intuitively. In addition, the array arrangement of the plurality of switches also facilitates maintenance of the switches in the signal transfer apparatus 1.

In a possible implementation, as shown in FIG. 4, when a quantity of switches connected to the drive sub-circuits is 1, the drive sub-circuits 51 are arranged on one side of the connected switches 30. The drive sub-circuits 51 are close to the connected switches 30, which facilitates maintenance of the drive sub-circuits in the signal transfer apparatus 1. Connection between the switch, the drive sub-circuit, the second terminal, and the first terminal can be performed intuitively.

As shown in FIG. 4, the switch is the field-effect transistor MOS, and the drive sub-circuit 51 is located "below" the field-effect transistor MOS. The first end of each first terminal 11 is connected to a source of each field-effect transistor MOS in a corresponding row in the array, and the first end of each second terminal 21 is connected to a drain of each field-effect transistor MOS in a corresponding column in the array. In the signal transfer apparatus 1, that the drive sub-circuit 51 is located "below" the field-effect transistor MOS may mean that the drive sub-circuit 51 is located in some or all areas of the field-effect transistor MOS in physical space, including upper, lower, front, rear, left, and right areas. For example, if the drive sub-circuit 51 shown in FIG. 4 includes a transistor VT and a resistor R1, the transistor VT and the resistor R1 may be respectively located in left and right areas of the field-effect transistor MOS in physical space.

A quantity of the terminals in the first terminal group 10 and the second terminal group 20 in FIG. 4 is shown in FIG. 2, where a1, a2, a3, . . . , d10, d11, and d12 represent the first terminals in the first terminal group 10, and A1, A2, A3, . . . , D10, D11, and D12 represent the second terminals in the second terminal group 20. In FIG. 4, a first end of a1 is connected to a source of each field-effect transistor MOS in a first row, a first end of a2 is connected to a source of each field-effect transistor MOS in a second row, a first end of a3 is connected to a source of each field-effect transistor MOS in a third row, . . . , a first end of d10 is connected to a source of each field-effect transistor MOS in an antepenultimate row, a first end of d11 is connected to a source of each field-effect transistor MOS in a penultimate row, and a first end of d12 is connected to a source of each field-effect transistor MOS in a last row. In addition, a first end of A1 is connected to a drain of each field-effect transistor MOS in a first column, a first end of A2 is connected to a drain of each field-effect transistor MOS in a second column, a first end of A3 is connected to a drain of each field-effect transistor MOS in a third column, . . . , a first end of D10 is connected to a drain of each field-effect transistor MOS in an antepenultimate column, a first end of D11 is connected to a drain of each field-effect transistor MOS in a penultimate column, and a first end of D12 is connected to a drain of each field-effect transistor MOS in a last column.

In actual use, assuming that a signal path between a1 and D12 is pre-connected, a control signal needs to be output to a drive sub-circuit 51 connected to a MOS transistor numbered a1_D12 by using the control module 40. After receiving the control signal, the drive sub-circuit 51 drives the MOS transistor numbered a1_D12 to be connected, so that the signal path between a1 and D12 is connected.

It should be noted that, a connection manner between the field-effect transistor MOS, the first end of the first terminal, the first end of the second terminal, and the drive sub-circuit in FIG. 4 and component arrangement are merely examples of this embodiment of this application. Persons skilled in the art may perform arrangement according to an actual requirement. This is not limited in this application.

This application further provides a test system, including: the signal transfer apparatus 1; and a hardware-in-loop test system, connected to the signal transfer apparatus through an I/O interface. The test system is constructed based on the signal transfer apparatus efficiently and quickly, which significantly reduces construction time. In addition, configuration expansion can also be implemented by arranging a plurality of signal transfer apparatuses in the test system, and a quantity of to-be-tested apparatuses can be increased.

This application further provides a test platform, including: the signal transfer apparatus 1; a hardware-in-loop test system, connected to the signal transfer apparatus through a first I/O interface; and a to-be-tested apparatus, connected to the signal transfer apparatus through a second I/O interface. The test platform is constructed based on the signal transfer apparatus efficiently and quickly, which significantly reduces construction time. In addition, configuration expansion can also be implemented by arranging a plurality of signal transfer apparatuses in the test platform, and a quantity of to-be-tested apparatuses can be increased.

Figure 5:
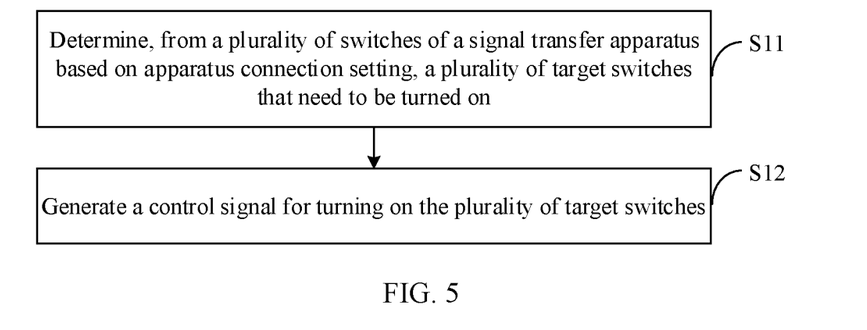
FIG. 5 is a flowchart of a signal transfer control method according to an embodiment of this application.

FIG. 5 is a flowchart of a signal transfer control method according to an embodiment of this application. As shown in FIG. 5, the method may include step S11 and step S12.

In step S11, a plurality of target switches that need to be turned on are determined from a plurality of switches of a signal transfer apparatus based on apparatus connection setting, where one of the plurality of switches is connected in series between a first end of each of a plurality of first terminals in a first terminal group of the signal transfer apparatus and a first end of each of a plurality of second terminals in a second terminal group of the signal transfer apparatus.

The apparatus connection setting is used to indicate a hardware-in-loop test system and a to-be-tested apparatus that are connected to the signal transfer apparatus, the first terminals connected to the hardware-in-loop test system, and the second terminals connected to the to-be-tested apparatus.

In step S12, a control signal for turning on the plurality of target switches is generated.

Implementations of step S11 and step S12 are similar to working principles and processes of the foregoing control module. For details, refer to the foregoing description. Details are not described herein again. According to the foregoing method, test personnel may configure a mapping relationship between terminals in the first terminal group and the second terminal group of the signal transfer apparatus in a customized and automated manner according to an actual requirement, and a test platform is constructed efficiently and quickly, which significantly reduces construction time.

In a possible implementation, the method may further include: driving, based on the control signal, the plurality of target switches to be turned on, so that signal paths between the first terminals and the second terminals that are connected to the target switches are connected.

In a possible implementation, the method may further include: obtaining, from at least one signal configuration list stored in a storage module, a target signal configuration list corresponding to the apparatus connection setting, and buffering the target signal configuration list, where each signal configuration list is used to record a switch that needs to be turned on in the plurality of switches under different apparatus connection setting. Step S11 may include: determining, from the plurality of switches based on the target signal configuration list and the apparatus connection setting, the plurality of target switches that need to be turned on. In this way, the signal configuration list may be preset for storage, so that a process of configuring the mapping relationship between the terminals in the first terminal group and the second terminal group can be simplified.

In a possible implementation, the method may further include: replacing, according to a received list switching instruction, a currently buffered target signal configuration list with a signal configuration list in the storage module that is indicated by the list switching instruction. In this way, the test personnel may switch, according to the list switching instruction, the target signal configuration list used by the control module.

In a possible implementation, the method may further include: communicating with a terminal device, and receiving the list switching instruction from the terminal device. In this way, the test personnel can remotely configure the mapping relationship between the terminals in the first terminal group and the second terminal group by using the terminal device.

In a possible implementation, the method may further include: receiving a newly added signal configuration list from the terminal device, and forwarding the newly added signal configuration list to the storage module, so that the storage module stores the received newly added signal configuration list. The test personnel may remotely send the newly added signal configuration list by using the terminal device, and configure the mapping relationship between the terminals in the first terminal group and the second terminal group by using the newly added signal configuration list.

In a possible implementation, the method may further include: receiving a list deletion instruction from the terminal device, and forwarding the list deletion instruction to the storage module, so that the storage module deletes, according to the received list deletion instruction, a signal configuration list that the list deletion instruction instructs to delete. In this way, the test personnel may remotely delete the signal configuration list in the storage module by using the terminal device.

In a possible implementation, the method may further include: receiving the apparatus connection setting from the terminal device. The test personnel may remotely send the apparatus connection setting by using the terminal device, to implement remote configuration of the mapping relationship between the terminals in the first terminal group and the second terminal group.

In a possible implementation, the plurality of switches may be divided into a plurality of switch groups. Step S11 may include: determining, based on the apparatus connection setting, a target switch that needs to be turned on in the switch groups. Step S12 may include: generating a control signal for turning on a target switch that needs to be turned on in the switch groups. In this way, a scale of the signal transfer apparatus may be expanded, and quantities of the first terminals and the second terminals may be increased.

The signal transfer control method provided in this application may be applied to the signal transfer apparatus 1, or may be applied to some modules in the signal transfer apparatus 1, for example, applied to a control module, or applied to a control module and a driver module.

The flowcharts and the block diagrams in the accompanying drawings show possibly implemented system architectures, functions, and operations of the apparatus, system, and method according to a plurality of embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in an order different from that marked in the accompanying drawings. For example, two consecutive blocks may actually be executed substantially in parallel, or may sometimes be executed in a reverse order, depending on a function involved.

It should also be noted that each block in the block diagrams and/or the flowcharts, and combinations of the blocks in the block diagrams and/or the flowcharts may be implemented by hardware (for example, a circuit or an ASIC (Application Specific Integrated Circuit)) that performs a corresponding function or action, or may be implemented by a combination of hardware and software, for example, firmware.

Although this application is described with reference to the embodiments, in a process of implementing this application that claims protection, persons skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

The embodiments of this application have been described above, and the foregoing description is exemplary, not exhaustive, and is not limited to the disclosed embodiments. It is apparent to persons of ordinary skill in the art that many modifications and changes may be made without departing from the scope and spirit of the described embodiments. The terms used herein are selected to best explain principles of the embodiments, practical applications, or improvements to technologies in the market, or to enable other persons of ordinary skill in the art to understand the embodiments disclosed herein.

What is claimed is:

1. A signal transfer apparatus, wherein the apparatus comprises: a first terminal group, a second terminal group, a plurality of switches, a controller, and a drive circuit; wherein
the first terminal group comprises a plurality of first terminals, the second terminal group comprises a plurality of second terminals, and one of the plurality of switches is connected in series between a first end of each of the first terminals and a first end of each of the second terminals;
the controller is configured to: determine, from the plurality of switches based on an apparatus connection setting, a plurality of target switches that need to be turned on, and send a control signal for turning on the plurality of target switches to the drive circuit; and
the drive circuit is connected to both the plurality of switches and the controller, and is configured to drive, based on the control signal, the plurality of target switches to be turned on, so that signal paths between the first terminals and the second terminals that are connected to the target switches are connected, wherein the apparatus connection setting indicates a hardware-in-loop test system and a to-be-tested apparatus that are connected to the signal transfer apparatus, the first terminals connected to the hardware-in-loop test system, and the second terminals connected to the to-be-tested apparatus.

2. The apparatus according to claim 1, wherein the apparatus further comprises:
a storage, configured to store at least one signal configuration list, wherein each of the at least one signal configuration list records a switch that needs to be turned on in the plurality of switches, under a different apparatus connection setting;
the controller is further configured to obtain a target signal configuration list corresponding to the apparatus connection setting from the storage, and buffer the target signal configuration list; and
wherein the determining, from the plurality of switches based on apparatus connection setting, a plurality of target switches that need to be turned on comprises: determining, from the plurality of switches based on the target signal configuration list and the apparatus connection setting, the plurality of target switches that need to be turned on.

3. The apparatus according to claim 2, wherein
the controller is further configured to replace, according to a received list switching instruction, a currently buffered target signal configuration list with a signal configuration list in the storage that is indicated by the list switching instruction.

4. The apparatus according to claim 3, wherein the apparatus further comprises:
a communications circuit, configured to: communicate with a terminal device, and forward, to the controller, the list switching instruction received from the terminal device.

5. The apparatus according to claim 4, wherein
the communications circuit is further configured to receive a newly added signal configuration list from the terminal device, and forward the newly added signal configuration list to the storage; and
the storage is further configured to store the received newly added signal configuration list.

6. The apparatus according to claim 4, wherein
the communications circuit is further configured to receive a list deletion instruction from the terminal device, and forward the list deletion instruction to the storage; and
the storage is further configured to delete, according to the received list deletion instruction, a signal configuration list that the list deletion instruction instructs to delete.

7. The apparatus according to claim 6, wherein
the communications circuit is further configured to receive the apparatus connection setting from the terminal device, and forward the apparatus connection setting to the controller.

8. The apparatus according to claim 7, wherein the plurality of switches comprise at least one of a diode, a transistor, a field-effect transistor, or a circuit breaker.

9. The apparatus according to claim 8, wherein the controller comprises a plurality of control sub-circuits, the plurality of switches are divided into a plurality of switch groups, the control sub-circuits control turn-on/turn-off of switches in different switch groups, and each of the plurality of control sub-circuits is connected to the drive circuit; and
each of the plurality of control sub-circuits is configured to: when it is determined, based on the apparatus connection setting, that a controlled switch group comprises at least one target switch that needs to be turned on, send a control signal for turning on the at least one target switch to the drive circuit.

10. The apparatus according to claim 9, wherein the drive circuit comprises a plurality of drive sub-circuits, and each of the plurality of drive sub-circuits is connected to at least one of the plurality of switches and the control sub-circuits that control the at least one target switch; and
wherein the sending a control signal for turning on the at least one target switch to the drive circuit comprises: sending the control signal for turning on the at least one target switch to drive sub-circuits connected to the target switches.

11. The apparatus according to claim 10, wherein all switches connected to the plurality of drive sub-circuits belong to a same switch group.

12. The apparatus according to claim 10, wherein each of the plurality of drive sub-circuits comprises a transistor and a resistor.

13. The apparatus according to claim 12, wherein the plurality of switches are arranged in an array, a quantity of rows of the switches in the array is the same as a quantity of the first terminals, and a quantity of columns of the switches in the array is the same as a quantity of the second terminals;

the first end of each of the first terminals is connected to each of the plurality of switches in a corresponding row in the array, and the first end of each of the second terminals is connected to each of the plurality of switches in a corresponding column in the array.

14. A test system, comprising:

a signal transfer apparatus, wherein the apparatus comprises:
- a first terminal group, a second terminal group, a plurality of switches, a controller, and a drive circuit; wherein
- the first terminal group comprises a plurality of first terminals, the second terminal group comprises a plurality of second terminals, and one of the plurality of switches is connected in series between a first end of each of the first terminals and a first end of each of the second terminals;
- the controller is configured to: determine, from the plurality of switches based on an apparatus connection setting, a plurality of target switches that need to be turned on, and send a control signal for turning on the plurality of target switches to the drive circuit; and
- the drive circuit is connected to both the plurality of switches and the controller, and is configured to drive, based on the control signal, the plurality of target switches to be turned on, so that signal paths between the first terminals and the second terminals that are connected to the target switches are connected, wherein
- the apparatus connection setting indicates a hardware-in-loop test system and a to-be-tested apparatus that are connected to the signal transfer apparatus, the first terminals connected to the hardware-in-loop test system, and the second terminals connected to the to-be-tested apparatus; and a hardware-in-loop test system, connected to the signal transfer apparatus through an I/O interface.

15. A signal transfer control method, comprising:

determining, from a plurality of switches of a first apparatus based on an apparatus connection setting, a plurality of target switches that need to be turned on, wherein one of the plurality of switches is connected in series between a first end of each of a plurality of first terminals in a first terminal group of the first apparatus and a first end of each of a plurality of second terminals in a second terminal group of the first apparatus; and generating a control signal for turning on the plurality of target switches, wherein the apparatus connection setting indicates a hardware-in-loop test system and a to-be-tested apparatus that are connected to the first apparatus, the first terminals connected to the hardware-in-loop test system, and the second terminals connected to the to-be-tested apparatus.

16. The method according to claim 15, wherein the method further comprises:

driving, based on the control signal, the plurality of target switches to be turned on, so that signal paths between the first terminals and the second terminals that are connected to the target switches are connected.

17. The method according to claim 16, wherein the method further comprises:

obtaining, from at least one signal configuration list stored in a storage, a target signal configuration list corresponding to the apparatus connection setting, and buffering the target signal configuration list, wherein each of the at least one signal configuration list records a switch that needs to be turned on, in the plurality of switches, under a different apparatus connection setting; and wherein the determining, from a plurality of switches of a first apparatus based on apparatus connection setting, a plurality of target switches that need to be turned on comprises: determining, from the plurality of switches based on the target signal configuration list and the apparatus connection setting, the plurality of target switches that need to be turned on.

18. The method according to claim 17, wherein the method further comprises:

replacing, according to a received list switching instruction, a currently buffered target signal configuration list with a signal configuration list in the storage that is indicated by the list switching instruction.

19. The method according to claim 18, wherein the method further comprises:

communicating with a terminal device, and receiving the list switching instruction from the terminal device.

20. The method according to claim 19, wherein the method further comprises:

receiving a newly added signal configuration list from the terminal device, and forwarding the newly added signal configuration list to the storage to cause the storage to store the received newly added signal configuration list.

\* \* \* \* \*